(12) United States Patent
Fåhraeus et al.

(10) Patent No.: US 7,751,089 B2
(45) Date of Patent: Jul. 6, 2010

(54) METHOD FOR COMPRESSING A DIGITAL REPRESENTATION CONTAINING A PAGE-DESCRIBING CODE, WHICH IS SENT FROM A COMPUTER TO A PRINTER

(75) Inventors: Christer Fåhraeus, Bjärred (SE); Stefan Lynggaard, Lund (SE); Stefan Burström, Lund (SE)

(73) Assignee: Anoto AB (SE)

( * ) Notice: Subject to any disclaimer, the term of this patent is extended or adjusted under 35 U.S.C. 154(b) by 939 days.

(21) Appl. No.: 10/558,062

(22) PCT Filed: May 26, 2004

(86) PCT No.: PCT/SE2004/000805
§ 371 (c)(1),
(2), (4) Date: Nov. 23, 2005

(87) PCT Pub. No.: WO2004/104818
PCT Pub. Date: Dec. 2, 2004

(65) Prior Publication Data
US 2006/0244985 A1    Nov. 2, 2006

Related U.S. Application Data

(60) Provisional application No. 60/473,201, filed on May 27, 2003.

(30) Foreign Application Priority Data
May 26, 2003   (SE) .................................. 0301548

(51) Int. Cl.
H04N 1/40   (2006.01)
G06F 3/12   (2006.01)

(52) U.S. Cl. .................................. 358/3.28; 358/1.15

(58) Field of Classification Search ................ 358/3.28, 358/1.15
See application file for complete search history.

(56) References Cited

U.S. PATENT DOCUMENTS 5,221,833 A    6/1993   Hecht
(Continued)

FOREIGN PATENT DOCUMENTS

DE    101 18 304 A1    10/2002
(Continued)

OTHER PUBLICATIONS

Adams, Russ. Plessey Bar Code Specification Page. Copyright 1995. http://www.adams1.com/plessy.html. Accessed Jun. 10, 2009.*
(Continued)

*Primary Examiner*—Twyler L Haskins
*Assistant Examiner*—Fred Guillermety
(74) *Attorney, Agent, or Firm*—Finnegan, Henderson, Farabow, Garrett & Dunner (57) ABSTRACT

A computer-implemented method is designed for printing on regular digital printers of a coding pattern consisting of regularly spaced code symbols. In the method, a page-describing code (e.g. in PostScript programming language) is generated for the printer. The generation of the page-describing code is based a character definition set which assigns a set of characters to represent a set of mutually unique groups of the code symbols. By mapping the set of mutually unique groups against the coding pattern, the location of corresponding groups within the coding pattern can be identified. Each of the corresponding groups is then represented by its assigned character in the page-describing code. The resulting page-describing code is small in size and has a reduced set of printer instructions that can be processed efficiently by the receiving printer.

26 Claims, 8 Drawing Sheets

U.S. PATENT DOCUMENTS

| | | | |
|---|---|---|---|
| 5,245,165 | A | 9/1993 | Zhang |
| 5,449,896 | A | 9/1995 | Hecht et al. |
| 5,477,012 | A | 12/1995 | Sekendur |
| 5,862,255 | A | 1/1999 | Davies et al. |
| 6,000,613 | A | 12/1999 | Hecht et al. |
| 6,000,621 | A | 12/1999 | Hecht et al. |
| 6,208,771 | B1 | 3/2001 | Jared et al. |
| 6,330,976 | B1 | 12/2001 | Dymetman et al. |
| 6,548,768 | B1 | 4/2003 | Pettersson et al. |
| 6,732,927 | B2 | 5/2004 | Olsson et al. |
| 7,143,952 | B2 | 12/2006 | Ericson |
| 7,191,392 | B1 * | 3/2007 | Coar .................. 715/234 |
| 2003/0012455 | A1 | 1/2003 | Olsson et al. |
| 2003/0056169 | A1 | 3/2003 | Lapstun et al. |
| 2003/0066896 | A1 | 4/2003 | Pettersson et al. |
| 2003/0085884 | A1 | 5/2003 | Pettersson et al. |
| 2003/0174135 | A1 * | 9/2003 | Gyllenskog et al. ......... 345/471 |
| 2006/0133877 | A1 | 6/2006 | Lynggaard |

FOREIGN PATENT DOCUMENTS

| | | | |
|---|---|---|---|
| EP | 1186991 | A2 | 3/2002 |
| WO | WO 92/17859 | | 10/1992 |
| WO | WO-00/73983 | | 12/2000 |
| WO | WO-01/71643 | A1 | 3/2001 |
| WO | WO-01/26032 | A1 | 4/2001 |
| WO | WO-01/71653 | A1 | 9/2001 |
| WO | WO-01/75773 | A1 | 10/2001 |
| WO | WO 01/75779 | A1 | 10/2001 |
| WO | WO-02/082366 | A1 | 10/2002 |
| WO | WO 02/084473 | A1 | 10/2002 |
| WO | WO 03/001440 | A1 | 1/2003 |
| WO | WO 03/003288 | A1 | 1/2003 |
| WO | WO 2004/104818 | A1 | 12/2004 |

OTHER PUBLICATIONS

Office Action mailed Jul. 31, 2009, in co-pending U.S. Appl. No. 10/560,231 (6 pages).

International Search Report mailed Sep. 17, 2004 in PCT/SE/2004/000906 (3 pages).

* cited by examiner

_u : up
_l : left
_d : down
_r : right

FIG. 3D (KP5n9)_n
(GJcq9)_n
(xsnf8)_n
(xZöX0)_n

_u : up, small
_l : left, small
_d : down, small
_r : right, small
_U : up, large
_L : left, large
_D : down, large
_R : right, large

FIG. 6C (A) : _u_u
(B) : _u_l
⋮
(6) : _R_R
(7) : _u
(8) : _l (9) : _d
(0) : _r
(!) : _U
(#) : _L
([) : _D
(]) : _R

METHOD FOR COMPRESSING A DIGITAL REPRESENTATION CONTAINING A PAGE-DESCRIBING CODE, WHICH IS SENT FROM A COMPUTER TO A PRINTER

CROSS-REFERENCE TO RELATED APPLICATIONS

The present application claims the benefit of Swedish patent application No. 0301548-4, filed on May 26, 2003, and U.S. Provisional patent application No. 60/473,201, filed on, May 27, 2003, which both are hereby incorporated by reference.

FIELD OF THE INVENTION

The present invention generally relates to printing of coding patterns on on-demand digital printers.

BACKGROUND ART

It is known to use a coding pattern to embed some type of information in a passive base such as a sheet of paper, a writing board or equivalent. A suitably programmed scanner, fax machine, camera or digital pen can then read, recreate and use the information embedded locally in the base. For example, graphical information on a base can be supplemented with embedded information which extends the functionality of the base. Such embedded information can comprise file data for full or partial recreation of the graphical information, commands, supplementary text or images, hyperlinks, absolute positions, etc.

Coding patterns are generally constructed around some form of machine-readable code symbols which are regularly spaced on the base. Examples of such coding patterns are given in U.S. Pat. Nos. 5,221,833; 5,477,012; WO 00/73983; WO 01/26032; WO 01/71643; and U.S. Pat. No. 6,330,976.

In many cases, bases with a coding pattern can be generated on a large scale and with high precision in the graphics industry. There are, however, also occasions when it is desirable to create bases with a coding pattern on a small scale. This can then be carried out using a personal computer, to which a printer of, for example, the ink-jet or laser type, has been connected.

This can be carried out in such a way that the required coding pattern is created as an image file in a graphical format, for example, in bitmap format. This image file is converted into a page-describing and normally printer-independent code, such as PostScript (trademark), after which it is transmitted to the printer unit. On the basis of the page-describing code, the printer unit creates corresponding instructions for control of the printer's hardware. This hardware can, in the case of a laser printer, comprise a laser diode with associated optics. In an ink-jet printer, the hardware may comprise an ink ejector. The printing is then carried out on a base, for example a sheet of paper.

If the coding pattern has a high information density, which can be achieved by high information content in each code symbol and/or by dense arrangement of the code symbols on the base, the image file and the page-describing code may become large. Consequently, transfer times and printer processing times for such code may become excessive.

WO 02/082366 proposes a technique to reduce the size of the page-describing code, specifically for a coding pattern that codes a continuous sequence of absolute positions in two dimensions. Here, the printer unit is integrated with a pattern generation module, which is implemented by software and/or hardware to generate the coding pattern based on information describing the boundaries of the absolute positions to be coded on the base. Thus, the page-describing code can be supplemented by such boundary information to represent the coding pattern. This approach provides for significant reduction in both transfer time and printer processing time.

However, it may be difficult or even impossible to upgrade existing printers with the necessary pattern generation module. This may cause a technological barrier to the introduction and adoption of coding patterns on passive bases, since a large number of prospective users must invest in new printers.

SUMMARY OF THE INVENTION

An object of the present invention thus is to provide a printing technique that overcomes the above problems.

These and other objects that will be evident from the following description are now achieved wholly or partly by methods and apparatuses according to independent claims 1, 15, 21 and 22. Preferred embodiments are defined in the dependent claims.

BRIEF DESCRIPTION OF THE DRAWINGS

The invention will now be described by way of example with reference to the accompanying drawings, which schematically illustrate currently preferred embodiments.

DETAILED DESCRIPTION OF THE INVENTION

Figure 1:
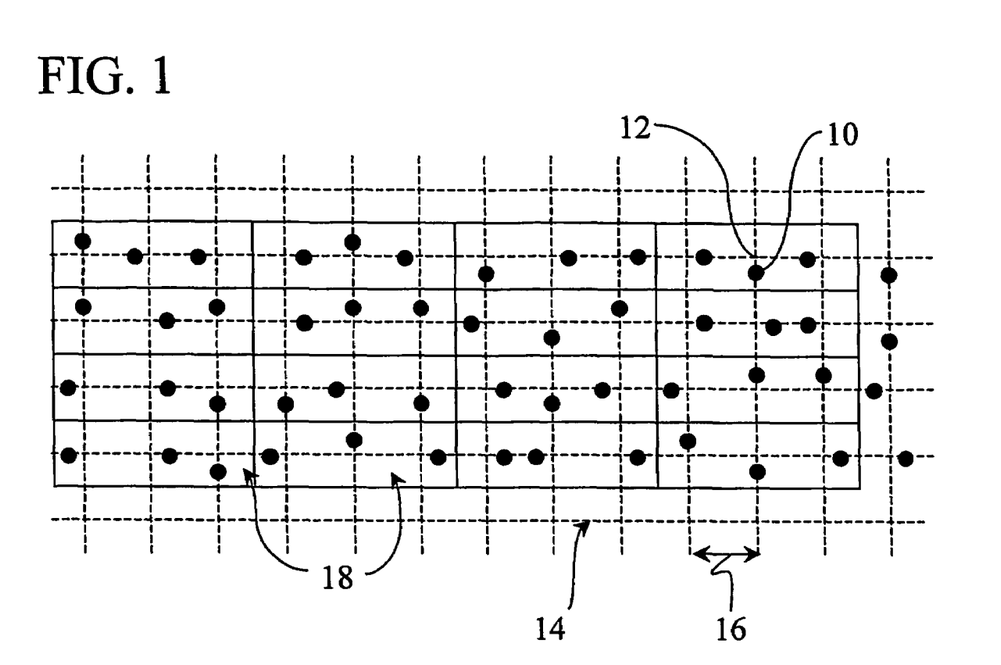
FIG. 1 is a view showing of a first prior art coding pattern.

FIG. 1 illustrates a part of an absolute position-coding pattern, which will be used to exemplify the invention. The position-coding pattern is detailed in Applicant's International Patent Publication No. WO 01/26032, which is incorporated herein by this reference. Principally, the coding pattern of FIG. 1 is made up of simple graphical symbols, which can assume four different values and thus are capable of coding two bits of information. Each symbol consists of a mark 10 and a spatial reference point or nominal position 12, the mark 10 being displaced or offset a distance in one of four different directions from the nominal position 12. The value of each symbol is given by the direction of displacement. The symbols are arranged with the nominal positions 12 forming a regular raster or grid 14 which may be virtual and thus not explicitly included in the coding pattern. Thus, the symbols can be regarded as being arranged regularly in a two-dimensional symbol space which is defined by the grid.

Each absolute position is coded by the collective values of a group of symbols within a coding window, e.g. containing 6×6 adjacent symbols. Further, the coding is "floating", in the sense that an adjacent position is coded by a coding window displaced by one grid spacing. In other words, each symbol contributes in the coding of several positions.

The coding pattern of FIG. 1 may be used to code both positions and other data, or only other data than positions, as disclosed in Applicant's International Patent Publication No. WO 01/71653.

The coding pattern of FIG. 1 can be reproduced on a base with high information density. The grid spacing (as indicated by 16 in FIG. 1) may typically be 0.3 mm, which translates to more than 400,000 symbols on a 25 cm high by 15 cm wide page. Evidently, it might be difficult to print such a high-density coding pattern on a regular digital printer at a reasonable speed.

Figure 2A:
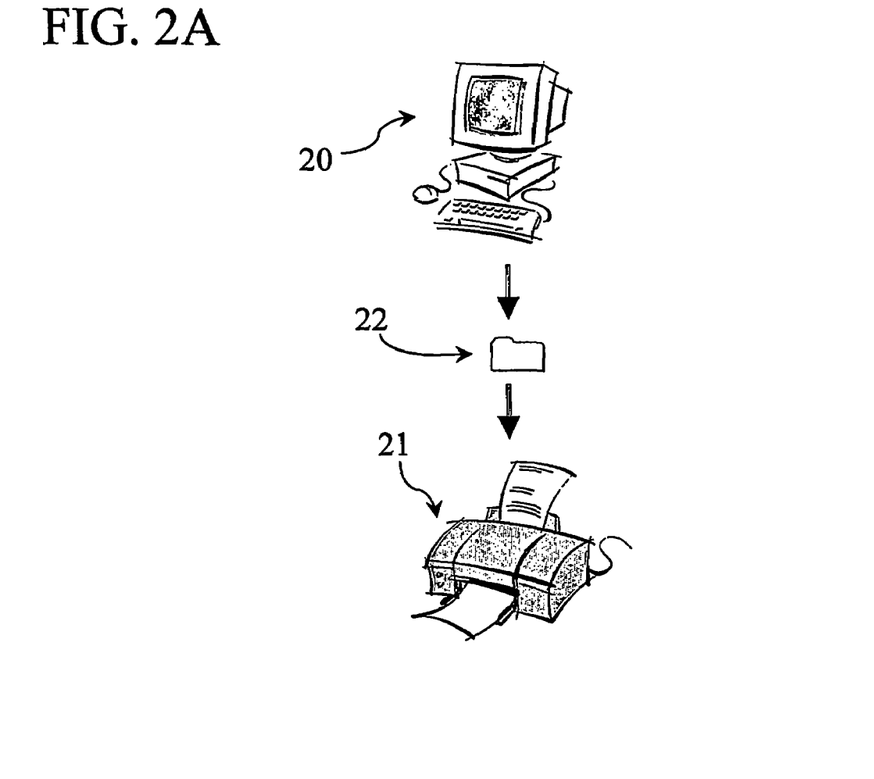
FIG. 2A is a schematic view of a system implementing a printing method according to the invention.

A system for printing such a high-density coding pattern is shown in FIG. 2A. The system includes a computer 20 and a printer 21. The printer 21 may be communicatively connected to the computer 20, so that a page-describing file 22 can be output for transfer from the computer 20 to the printer 21.

Figure 2B:
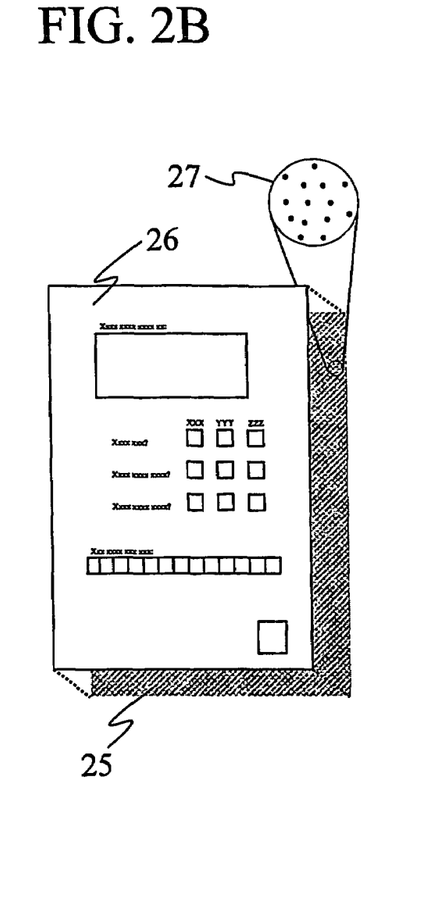
FIG. 2B is a schematic view of a base with an information layer and a coding layer.

The computer 20 has access to a digital representation of the coding pattern which is to be applied as a machine-readable coding layer on a base, for example a sheet of paper. The computer system may also have access to a digital representation of graphical data which is to be printed as a human-readable information layer on the same base. The graphical data may include text, drawings, rulings, images, etc, typically to guide or inform the user of the coded base. FIG. 2B illustrates a combination of such a coding layer 25 and information layer 26, including an enlarged view of the coding pattern 27. As will be further described below, the computer 20 is capable of generating a page-describing code of the coding layer 25 and the information layer 26, if present. The following examples assume that the page-describing code is text-based and written in the widely adopted PostScript (trademark) programming language, although other types of formats and programming languages are certainly conceivable, for example PCL (Printer Control Language).

The printer 21 receives the file 22, reads the page-describing code therein and converts it to adequate printing instructions. Most commercially available printers have such capability. The operating principle of the printer can be based on any technology that produces either monochrome or polychrome printouts, including but not limited to ink jet, laser, dye-sublimation, solid ink, thermal wax, thermal autochrome, and dot matrix technology.

Figure 2C:
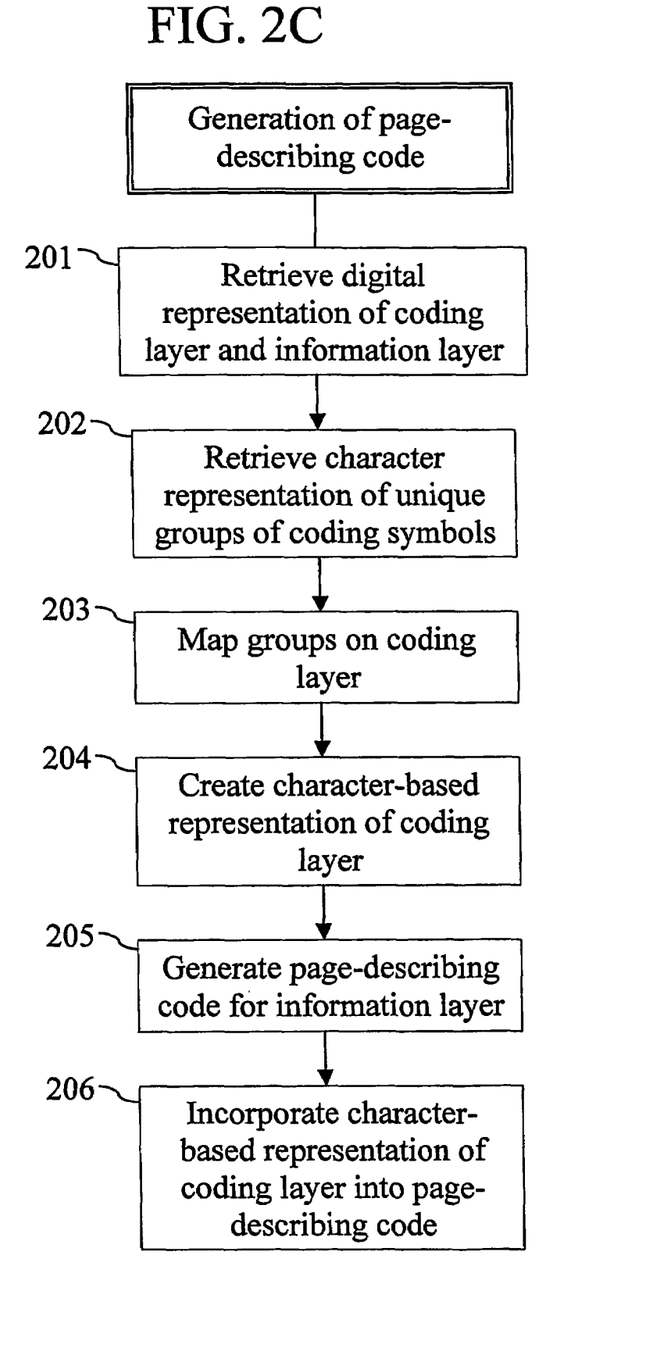
FIG. 2C is a flow chart of a printing method according to the invention.

FIG. 2C illustrates some principal steps that may be executed in the computer 20 in the generation of the page-describing file 22 to be provided to the printer 21.

In step 201, a digital representation of the coding layer is retrieved, suitably from a memory associated with the computer 20. The digital representation of the coding layer 25 may be supplied to the computer 20 in pre-generated form, or be generated by the computer 20 on demand. For example, the digital representation may include the above-mentioned symbol values, with the mutual spatial arrangement between the symbols being retained. Similarly, step 201 may include retrieval of a digital representation of the information layer 26 to be printed.

Step 202 includes retrieving a character definition, in which a set of characters is defined to represent mutually unique groups of the symbols of the coding pattern. The character definition may be either pre-defined or generated for a specific printing instance, and may later be transferred to the printer together with the page-describing code. Alternatively, if the definition is pre-defined, it may be resident in a non-volatile memory in the printer.

Each group of symbols defines a combination of symbol values with a given spatial arrangement. The symbols of a group need not be mutually adjacent, but can have any spatial interrelation as long as this interrelation is commensurate with the spatial arrangement of symbols in the coding pattern, e.g. the regular grid arrangement of in FIG. 1, which need not be either equidistant or orthogonal.

In step 203, the digital representation of the coding layer is parsed based on the character definition. More specifically, the different groups of symbols included in the character definition are mapped against the digital representation. For every match, the corresponding character is stored in a data structure to represent its corresponding group of symbols. Thus, in step 204, a character-based representation of the coding layer is created, in which each character represents a given combination of code symbols with a given spatial arrangement.

In step 205, a page-describing code is generated for the information layer. This step may be implemented according to prior art technique, known to the person skilled in the art.

In step 206, the character-based representation of the coding layer is incorporated into the page-describing code, to generate the final page-describing code for the information layer and the coding layer.

Steps 205 and 206 may alternatively be executed before or concurrent with the generation of the character-based representation (steps 203-204). Further, step 206 may be executed before or concurrent with step 205. Still further, step 205 may be excluded altogether, in the absence of any information layer.

The above generation of the page-describing code is suitably carried out in the computer 20 under control of a computer program, which may be embodied on a record medium, stored in a computer memory, embodied in a read-only memory or carried on an electrical carrier signal.

Specific features and advantages of the method outlined above will now be further illustrated by way of examples with reference to FIGS. 3-6. All examples are based on the use of the PostScript programming language to generate the page-describing file.

Figure 3A:
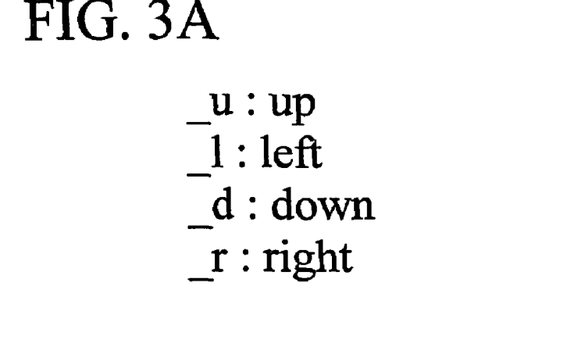
FIG. 3A is a view of a symbol definition for the pattern of FIG. 1.

As noted above, the coding pattern of FIG. 1 is based on four different coding symbols. In PostScript code, each symbol can be represented by a function/program call in the form of blank space (illustrated as "_" in the drawings) and a unique function/program name, as indicated in FIG. 3A. The corresponding function/program (not shown) comprises PostScript instructions to move a pointer from a starting location to a given printing location, to generate a circular dot of given size at the printing location, and to reset the printing location to a new starting location.

Figure 3B:
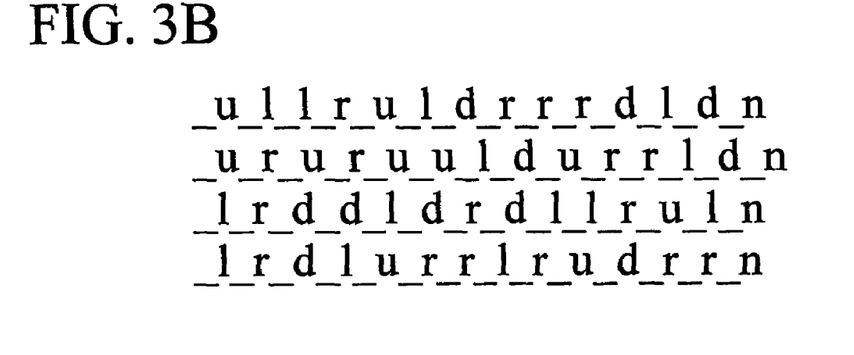
FIG. 3B is a schematic illustration of a basic page-describing code for the pattern of FIG. 1.

Thus, the coding layer can be represented in PostScript code by a set of function/program definitions and a set of function/program calls. FIG. 3B illustrates such a set of function/program calls, where each row corresponds to a row of code symbols in FIG. 1. Each row of PostScript code is ended by a new line command ("_n"). The resulting file will be large and processing intensive due to the large number of individual function/program calls.

Instead, a font may be defined and used to represent the coding layer in the page-describing file. An example of such a font is given in FIG. 3C. Each character in the font represents a unique group of code symbols, here a row segment of three consecutive symbols. Thus, each such group has a size of 1×3 in symbol space (number of symbol rows, number of symbol columns). For example, font character (A) is defined to consist of a first dot which is displaced a given distance upwardly from a first nominal position, a second dot which is displaced a given distance upwardly from a second nominal position, and a third dot which is displaced a given distance upwardly from a third nominal position.

The PostScript language is a text-based programming language based on the ASCII format. Thus, 128 unique characters are available in a font to represent symbol groups, less any characters that are predefined for basic function/program calls, such as "%", "/", "(", ")", etc. The unique 1×3 symbol groups in FIG. 3C can be represented by 64 characters. The font of FIG. 3C may be defined either as a bitmap font or an outline font. In a bitmap font, each character (i.e. each 1×3 symbol group) is represented as a fixed-size pixel image. In an outline font, each character is scaleable in size and represented by a mathematical expression.

In creating the page-describing file, the digital representation of the coding layer is parsed in symbol space, in this example row by row, to thereby divide the coding pattern into symbol groups, each such group being represented by a font character in the page-describing code. For illustrative purposes, these symbol groups are indicated by boxes 18 in FIG. 1.

Figure 3C:
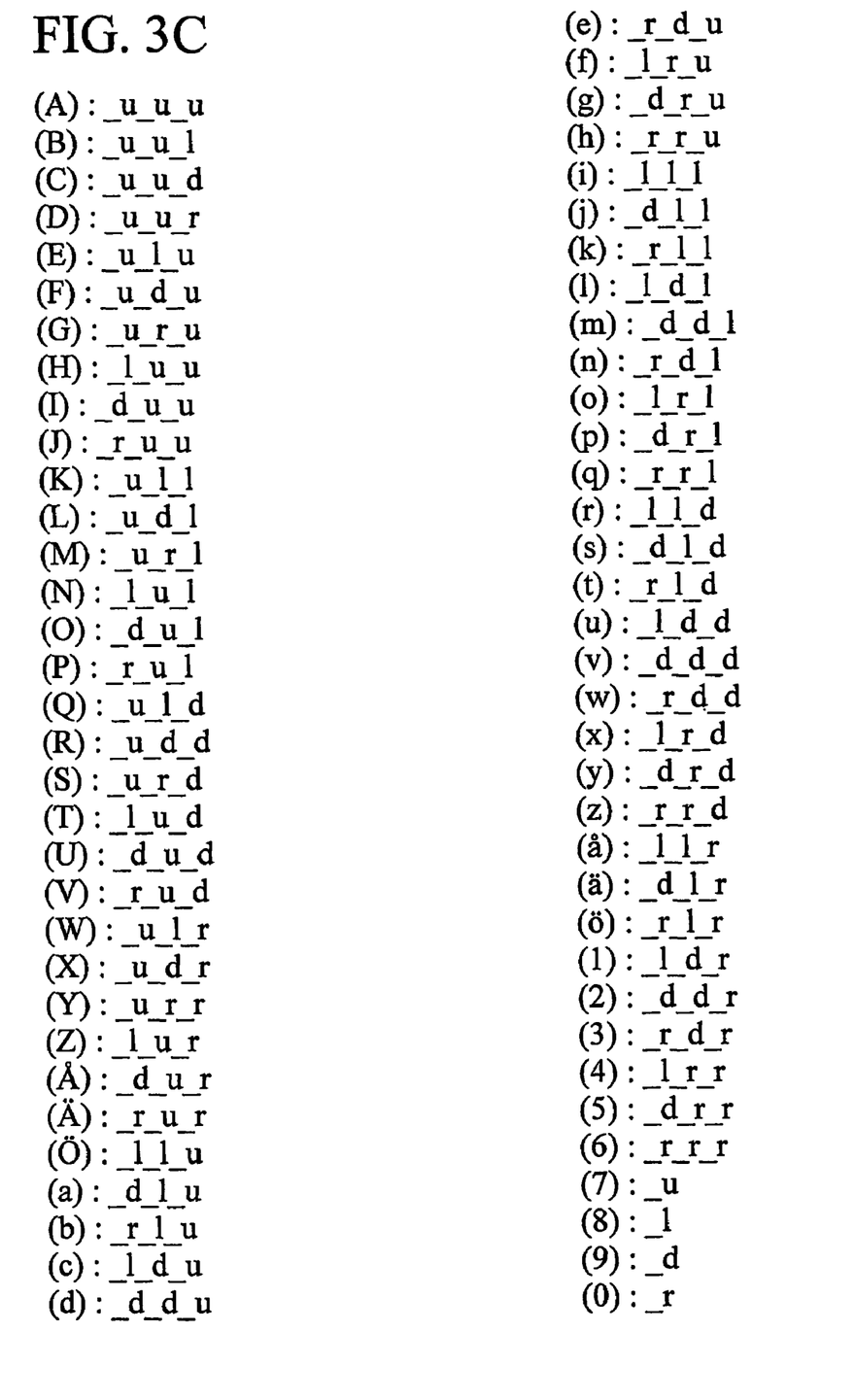
FIG. 3C is a schematic illustration of a font definition for the pattern of FIG. 1.
Figure 3D:
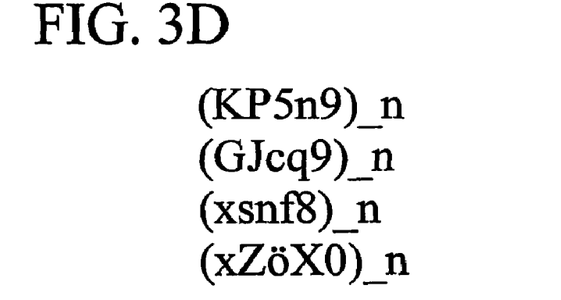
FIG. 3D is a schematic illustration of a page-describing code for the pattern in FIG. 1, based on the font definition in FIG. 3C.

FIG. 3D is a schematic version of the page-describing code of the coding pattern in FIG. 1, based on the font definition in FIG. 3C. Needless to say, an actual page-describing file will include further elements (overhead), such as a definition of basic properties of the coding pattern (e.g. grid spacing, mark size, mark offset), a definition of each font character (cf. FIG. 3C), a printer instruction to build a customized font in a font dictionary (e.g. based on the font definition in FIG. 3C), and a printer instruction to retrieve and scale the customized font and to set this font as the current font. The actual page-describing file will also include page-describing code for any graphical data to be printed together with the coding pattern.

This font-based approach has a number of general advantages. The font character representation is compact and results in a significant reduction in the number of code instructions compared to the representation of FIG. 3B. For example, for the above-mentioned 15×25 cm$^2$ page, the conventional PostScript code (based on FIG. 3B) exceeds 815,000 bytes (including about 300 bytes overhead), whereas the inventive PostScript code (based on FIG. 3C-3D) includes about 150,000 bytes (including about 3-10,000 bytes overhead). Further, digital printers are generally optimized for handling fonts, and may even have a dedicated cache memory for font definitions. Still further, since font characters have a predefined size (bitmap fonts) or a settable size (outline fonts), consecutive characters may be automatically aligned by the printer without a need for an explicit reset instruction. This may also contribute to increasing the processing speed in the printer. Further, the font-based approach has the potential of making a conversion from the page-describing code to PDF code (Portable Document Format) more efficient in terms of processing speed and resulting PDF code size, since the conversion may benefit from font-based text packing capabilities of existing PostScript to PDF converters.

Returning to FIG. 3C, it should be noted that the font definition also includes font characters (7, 8, 9, 0) that represent unique 1×1 symbol groups, i.e. the unique symbols by themselves. This done to handle a symbol residue that results from a potential mismatch of the group size and the coding pattern size in the symbol space. Such mismatch occurs when the coding pattern size and the group size are relatively prime in one or both dimensions of the symbol space. In the example of FIG. 1, there are 13 symbols in each row of the coding pattern. Evidently, all symbols cannot be divided into groups of three symbols. One symbol on each row is therefore represented by a single symbol character. In a more advanced scenario, the font definition may include other symbol groups, for example 1×2 symbol groups, to handle this problem.

It should be noted that other arrangements of the symbol groups are possible. FIG. 4 shows examples of groups that can be used to represent three symbols: linear adjacent arrangements (FIGS. 4A and 4C), linear nonadjacent arrangements (FIG. 4B), diagonal adjacent arrangements (FIG. 4D), and non-linear adjacent arrangements (FIGS. 4E-4H). One and the same font definition may include combinations of symbol groups with different spatial arrangements.

Figure 3E:
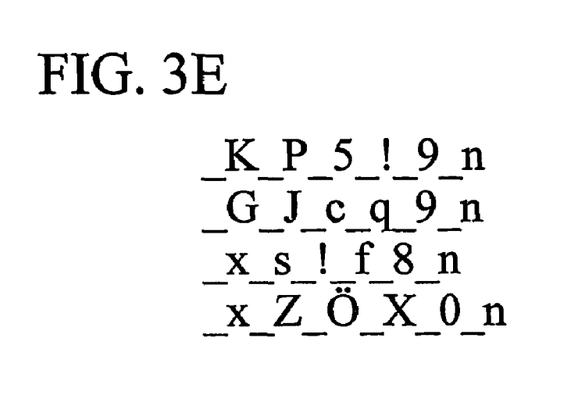
FIG. 3E is a schematic illustration of a page-describing code generated in an alternative embodiment.
Figure 4A:
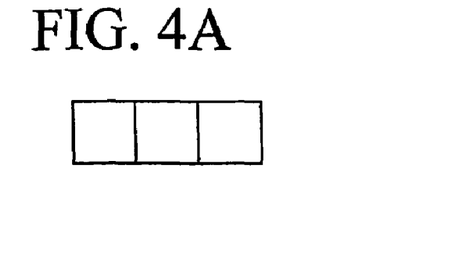
FIGS. 4A-4H are views showing different spatial symbol arrangements for use in the application of the inventive printing method to the pattern of FIG. 1.
Figure 4B:
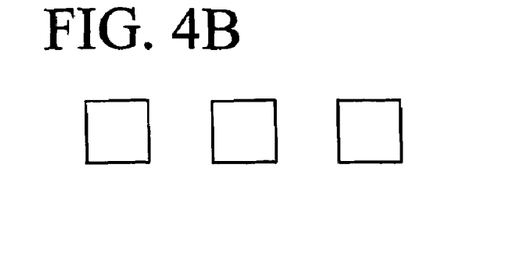
Figure 4C:
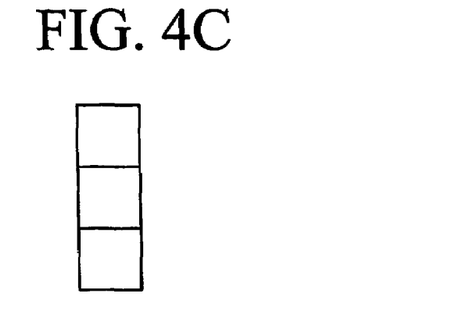
Figure 4D:
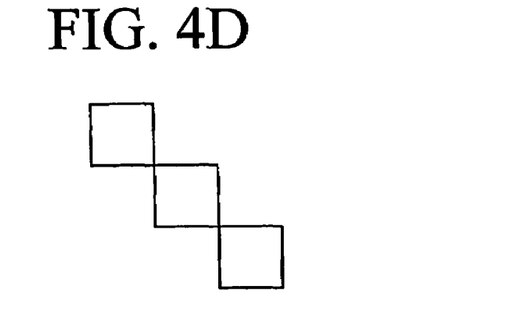
Figure 4E:
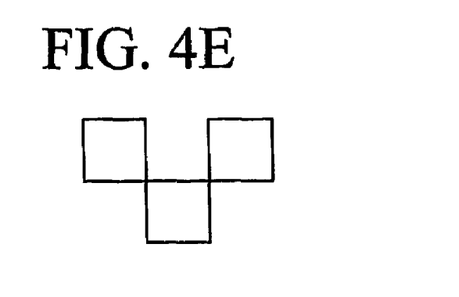
Figure 4F:
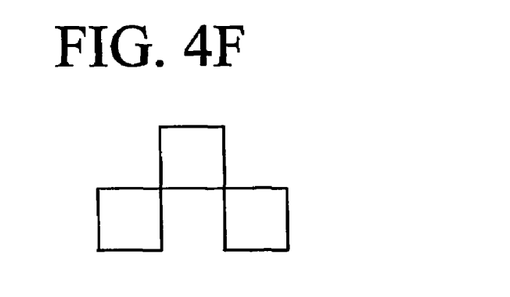
Figure 4G:
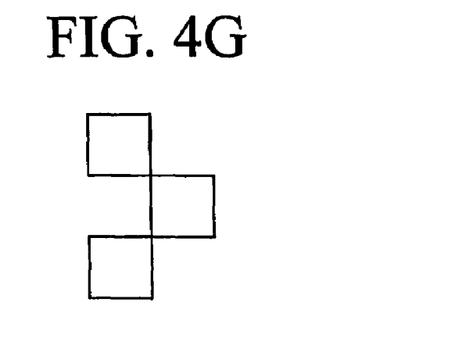
Figure 4H:
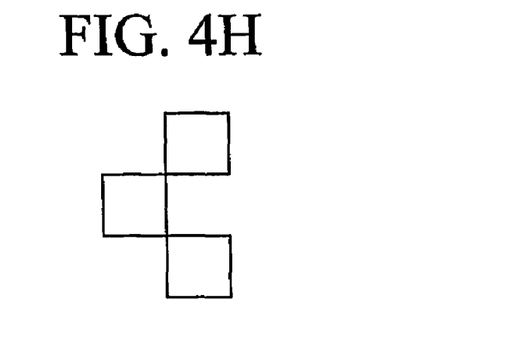

In an alternative embodiment, the character definition associates function/program calls, instead of font characters, with symbol groups. FIG. 3E shows a set of function/program calls that may represent the coding pattern in FIG. 1 in a page-describing file. Such a page-describing file would be based on a character definition in which each combination of blank space and a character represents printer instructions to generate a unique 1×3 symbol group. It could be noted that "_!" is used to represent the symbol group _r_d_l instead of "_n", which has predefined meaning (new line) in the PostScript language. This approach also results in a significant reduction in the number of code instructions compared to the representation of FIG. 3B. Returning to the example of the 15×25 cm$^2$ page, the PostScript code reduces to about 285,000 bytes (including about 10,000 bytes overhead). It should be noticed that the page-describing file may include instructions for the printer to store the results of the function/program calls in cache memory, to thereby increase the processing speed of the printer. Thus, instead of executing each call, the printer may simply retrieve the corresponding result from the cache memory.

Figure 5A:
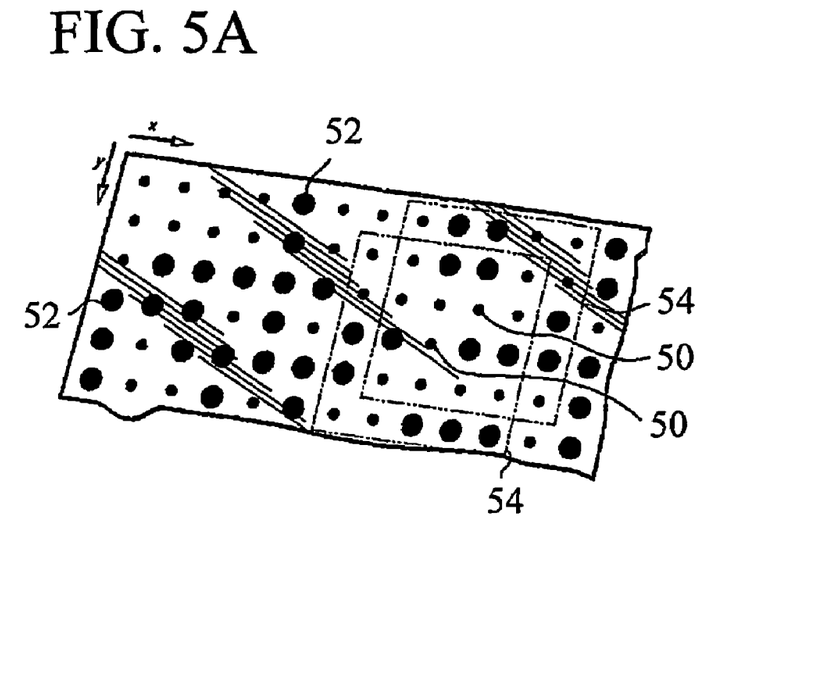
FIG. 5A is a view showing a second prior art coding pattern.

FIG. 5A shows another coding pattern, which is based on two different symbols: a small dot 50 and a large dot 52. Thus, each symbol may code one bit of information. The coding symbols are regularly spaced in the coding pattern. Like the coding pattern of FIG. 1, an absolute position may be coded by the symbols within a code window 54 of a given size. Also, the code windows 54 may overlap, so that each symbol may contribute to the coding of several positions (floating coding). The coding pattern is further described in aforesaid WO 00/73983, which is incorporated herein by this reference.

Figure 5B:
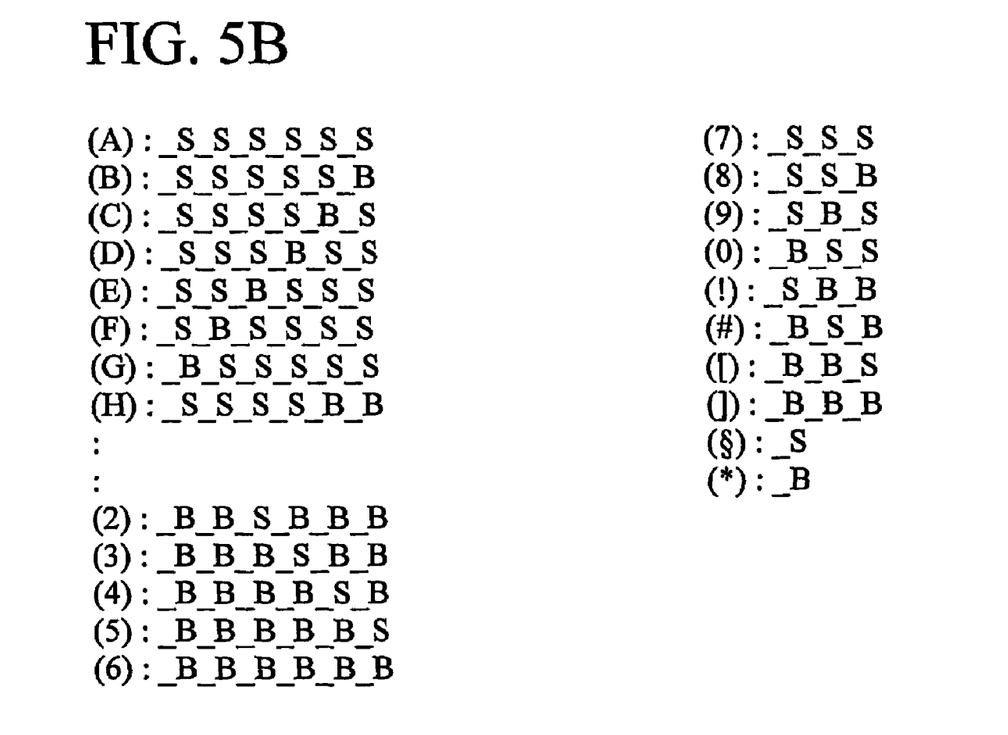
FIG. 5B is a schematic illustration of a font definition for the pattern of FIG. 5A.

FIG. 5B illustrates a font definition that may be used in generating a page-describing file for this type of coding pattern. Here, "_S" and "_L" denote instruction sets to generate a small dot and a large dot, respectively. The font definition contains 64 font characters that each represents a unique 1×6 symbol group. Further, to handle the mismatch problem, the font definition contains eight font characters that each represents a unique 1×3 symbol group, and two font characters that each represents a unique 1×1 symbol group.

In an alternative font definition (not shown), the 1×6 symbol groups may be exchanged for 6×1, 3×2 or 2×3 symbol groups. As a further alternative, and in analogy with FIG. 3E, the font definition may be exchanged for a definition set of function/program calls for generation of unique symbol groups.

The page-describing file may then be generated as described above in relation to FIGS. 2-3.

Figure 6A:
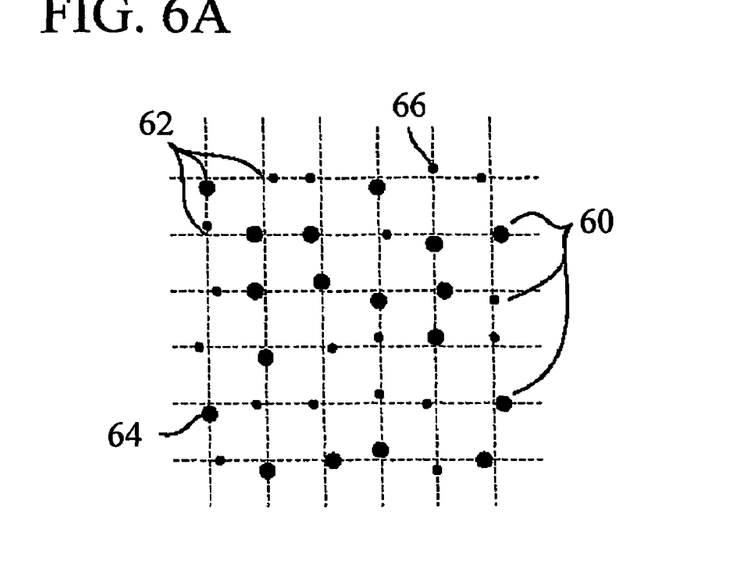
FIG. 6A is a view showing a third prior art coding pattern.
Figure 6B:
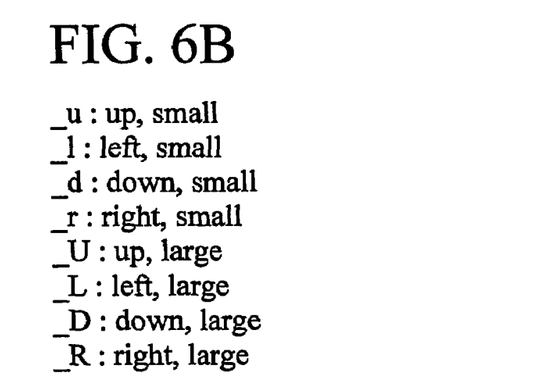
FIG. 6B is a view of a symbol definition for the pattern of FIG. 6A.

FIG. 6A shows a third coding pattern, which is made up of regularly spaced symbols. Each symbol comprises a mark 60 and a nominal position 62, the value of the symbol being given by the direction of displacement and the size of the mark (large dot 64, small dot 66). The coding pattern contains eight different symbols, as listed in FIG. 6B. This pattern is described in detail in US Patent Publication No. 2003/0066896, which is incorporated herein by this reference.

Figure 6C:
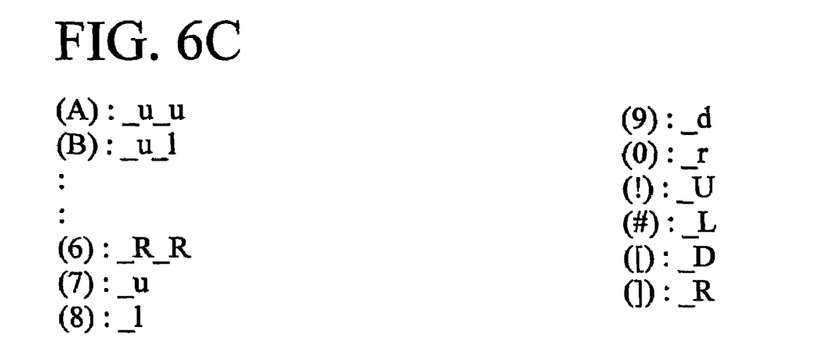
FIG. 6C is a schematic illustration of a font definition for the pattern of FIG. 6A.

FIG. 6C illustrates an example of a font definition to be used in the generation of a page-describing file according to the above methodology. Here, each of 64 unique font characters represents a unique 1×2 symbol group, and an additional set of eight font characters represents the unique 1×1 symbol groups. Again, other symbol group arrangements may be used, and the font definition may be exchanged for a definition set of function/program calls for generation of unique symbol groups.

The page-describing file may then be generated as described above in relation to FIGS. 2-3.

Generally speaking, the above methodology may be useful to expedite on-demand printing in conventional printers of all coding patterns that are made up of a finite set of recurring symbol groups. Thus, the above coding patterns are only given for purposes of illustration. In these as well as other relevant coding patterns, the code symbols may have a finite number of predetermined, discriminable graphical states, each such state yielding a coding value of the symbol. The graphical states may be represented by a magnitude of displacement of a code mark with respect to an associated spatial reference point, a direction of displacement of a code mark with respect to an associated spatial reference point, a shape of a code mark, a size (diameter, surface area, etc) of a code mark, a color (hue, greyscale, texture, etc) of a code mark, or any combination thereof. Further examples of relevant coding patterns are found in U.S. Pat. Nos. 5,221,833; 5,245,165; 5,449,896; 5,862,255; 6,000,613; 6,330,976; DE 10118304; WO 01/75773; and WO 01/71643.

In an alternative embodiment, the page-describing code is generated to represent the coding pattern solely by single-symbol font characters, i.e. font characters that each represent only one unique individual symbol. Such an embodiment still benefits from the general advantages of the font-based approach, as identified above, and is conceivable, e.g., when processing speed and simplicity is prioritized over file size.

Figure 7:
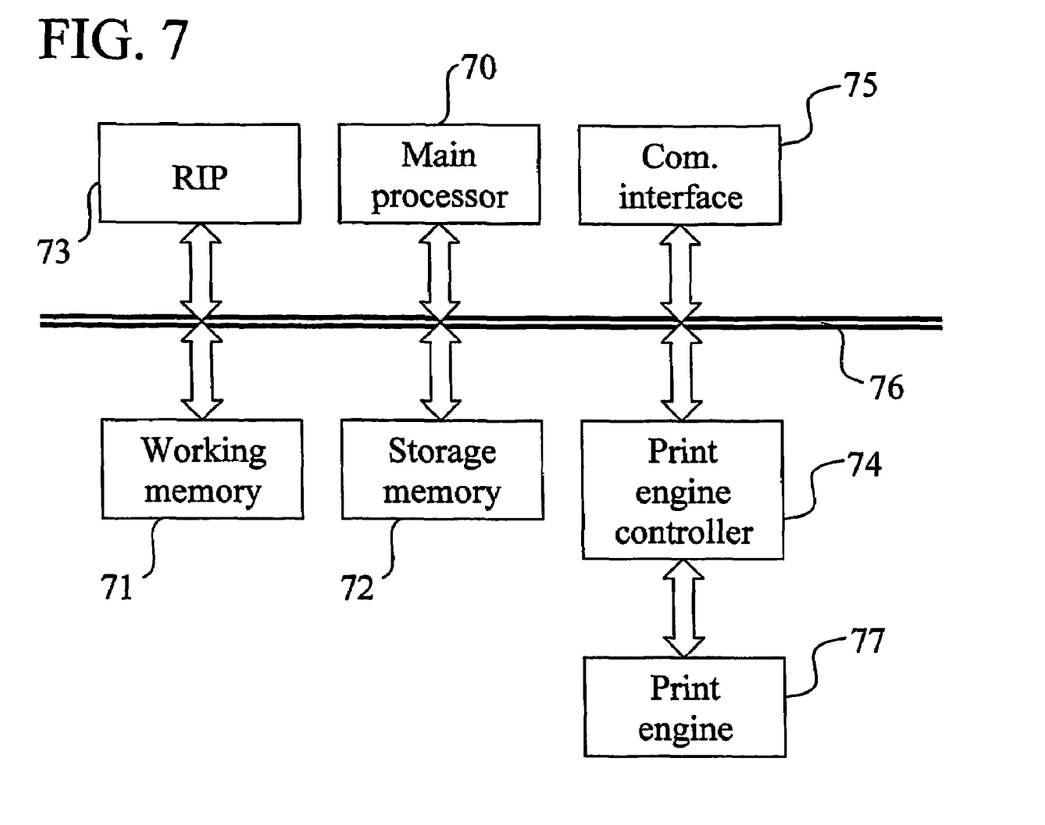
FIG. 7 is a schematic block diagram of an electronic circuitry part in the printer shown in FIG. 2A.

For the sake of completeness, FIG. 7 illustrates some main components of a conventional digital printer that may be used to print a coding pattern according to the invention. Such a digital printer may include a main processor 70 (e.g. CPU, microprocessor), a working memory 71 (e.g. RAM), a storage memory 72 (e.g. ROM, PROM, EEPROM, flash), a raster image processor (RIP) 73, a print engine controller 74, and a communications interface 75 (e.g. USB, Firewire, IrDA, Bluetooth, Ethernet, parallel port, modem) which are interconnected over a bus structure 76. The storage memory 72 holds the software for the main processor 70 and the RIP 73, as well as configuration data including any resident fonts. When the main processor 70 receives the page-describing file via the communications interface 75, it operates the RIP 73 to convert the page-describing code into a rasterized image, which is stored in the working memory 71. Optionally, the page-describing file may be processed to generate the coding layer and the information layer in two separate images. The print engine controller 74 is then operated to retrieve the rasterized image(s) from the working memory 71 and control a print engine 77 to generate a hardcopy of the rasterized image(s).

The invention claimed is:

1. A computer-implemented method of printing a position-coding pattern, comprising the steps of:
    retrieving a digital representation of said position-coding pattern, the position-coding pattern including a plurality of code symbols, each code symbol contributing to an encoding of at least one position;
    retrieving a character definition set which assigns a set of characters to represent sets of mutually unique groups of said code symbols, each character in the set of characters representing one of the mutually unique groups of code symbols;
    mapping said sets of mutually unique groups against said digital representation to identify locations of corresponding groups of said code symbols within said position-coding pattern;
    generating a page-describing code in which each of said corresponding groups is represented by its assigned character; and
    transferring the page-describing code to a printer which is adapted to convert the page-describing code into a printable image.

2. A method according to claim 1, wherein said step of transferring includes transferring said character definition set to said printer.

3. A method according to claim 1, wherein said step of generating includes incorporating said character definition set in the page-describing code.

4. A method according to claim 1, wherein said step of retrieving a character definition set includes retrieving a font definition.

5. A method according to claim 4, wherein said font definition defines an outline font.

6. A method according to claim 4, wherein said font definition defines a bitmap font.

7. A method according to claim 1, wherein said character definition set assigns a set of second characters to represent each unique individual code symbol in the coding pattern, and wherein said step of generating the page-describing code includes representing at least one code symbol by its corresponding second character, if the number of symbols in one dimension of the coding pattern to be printed and the number of code symbols in a corresponding dimension of said groups are found to be relative prime.

8. A method according to claim 1, wherein said step of generating includes generating the page-describing code as a text file, preferably a Postscript file or a Printer Control Language (PCL) file.

9. A method according to claim 1, wherein each code symbol is represented by a respective coding value in said digital representation.

10. A method according to claim 9, wherein a plurality of said coding values together code a position.

11. A method according to claim 9, wherein each coding value contributes in the coding of a plurality of positions.

12. A method according to claim 9, wherein each coding value represents a predetermined, discriminable graphical state of said code symbol.

13. A method according to claim 12, wherein each code symbol comprises a code mark and an associated spatial reference point, wherein said states are represented by characteristics selected from the group consisting of:
a magnitude of displacement of said code mark with respect to its associated spatial reference point;
a direction of displacement of said code mark with respect to its associated spatial reference point;
a shape of said code mark;
a size of said code mark;
a color of said code mark;
and any combination thereof.

14. A method according to claim 13, wherein said spatial reference points are regularly spaced in said coding pattern.

15. The computer-implemented method of claim 1, wherein each character in the set of characters represents a different set of mutually unique groups of said code symbols, wherein each set of the mutually unique groups has a predefined number of code symbols, and wherein the set of characters includes a character for every possible combination of unique groups of said code symbols having the predefined number of code symbols.

16. The computer-implemented method of claim 1, wherein the page-describing code also includes code representing an information layer and wherein the printable image illustrates the position-coding pattern superimposed with the information layer.

17. A computer-implemented method of printing a position-coding pattern, comprising the steps of:
retrieving a digital representation of said position-coding pattern, the position-coding pattern including a plurality of code symbols, each code symbol contributing to an encoding of at least one position;
retrieving a font definition which assigns a unique font character to represent each unique code symbol of said position-coding pattern;
identifying said unique code symbols in said digital representation;
generating a page-describing code in which each of the thus-identified code symbols is represented by its assigned font character; and
transferring the page-describing code to a printer which is adapted to convert the page-describing code into a printable image.

18. The computer-implemented method of claim 17, wherein the page-describing code also includes code representing an information layer and wherein the printable image illustrates the position-coding pattern superimposed with the information layer.

19. A computer program encoded in a computer-readable storage medium, the computer program, when executed by a computer, causing the computer to perform a method comprising:
retrieving a digital representation of a position-coding pattern, the position-coding pattern including a plurality of code symbols, each code symbol contributing to an encoding of at least one position;
retrieving a character definition set which assigns a set of characters to represent sets of mutually unique groups of said code symbols, each character in the set of characters representing one of the mutually unique groups of code symbols;
mapping said sets of mutually unique groups against said digital representation to identify locations of corresponding groups of said code symbols within said position-coding pattern;
generating a page-describing code in which each of said corresponding groups is represented by its assigned character; and
transferring the page-describing code to a printer which is adapted to convert the page-describing code into a printable image.

20. The computer program of claim 19, wherein each character in the set of characters represents a different set of mutually unique groups of said code symbols, wherein each set of the mutually unique groups has a predefined number of code symbols, and wherein the set of characters includes a character for every possible combination of unique groups of said code symbols having the predefined number of code symbols.

21. The computer program of claim 19, wherein the page-describing code also includes code representing an information layer and wherein the printable image illustrates the position-coding pattern superimposed with the information layer.

22. An apparatus for printing a position-coding pattern, comprising:
means for retrieving a digital representation of said position-coding pattern, the position-coding pattern including a plurality of code symbols, each code symbol contributing to an encoding of at least one position;
means for retrieving a character definition set which assigns a set of characters to represent sets of mutually unique groups of said code symbols, each character in the set of characters representing one of the mutually unique groups of code symbols;
means for mapping said sets of mutually unique groups against said digital representation to identify locations of corresponding groups of said code symbols within said position-coding pattern;
means for generating a page-describing code in which each of said corresponding groups is represented by its assigned character; and
means for outputting the page-describing code for transfer to a printer which is adapted to convert the page-describing code into a printable image.

23. The apparatus of claim 22, wherein each character in the set of characters represents a different set of mutually unique groups of said code symbols, wherein each set of the mutually unique groups has a predefined number of code symbols, and wherein the set of characters includes a character for every possible combination of unique groups of said code symbols having the predefined number of code symbols.

24. The apparatus of claim 22, wherein the page-describing code also includes code representing an information layer and wherein the printable image illustrates the position-coding pattern superimposed with the information layer.

25. An apparatus for printing a position-coding pattern, comprising:
means for retrieving a digital representation of said position-coding pattern, the position-coding pattern including a plurality of code symbols, each code symbol contributing to an encoding of at least one position;
means for retrieving a font definition which assigns a unique font character to represent each unique code symbol of said position-coding pattern;
means for identifying said unique code symbols in said digital representation;
means for generating a page-describing code in which each of the thus-identified code symbols is represented by its assigned font character; and
means for outputting the page-describing code for transfer to a printer which is adapted to convert the page-describing code into a printable image.

26. The apparatus of claim 25, wherein the page-describing code also includes code representing an information layer and wherein the printable image illustrates the position-coding pattern superimposed with the information layer.

* * * * *